(12) United States Patent
Fujita

(10) Patent No.: US 10,828,791 B2
(45) Date of Patent: Nov. 10, 2020

(54) HUMAN-COOPERATIVE INDUSTRIAL ROBOT INCLUDING PROTECTION MEMBER

(71) Applicant: FANUC Corporation, Yamanashi (JP)

(72) Inventor: Junya Fujita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/578,640

(22) Filed: Dec. 22, 2014

(65) Prior Publication Data

US 2015/0174771 A1    Jun. 25, 2015

(30) Foreign Application Priority Data

Dec. 25, 2013   (JP) ................... 2013-267253

(51) Int. Cl.
*B25J 19/06* (2006.01)
*B25J 19/00* (2006.01)

(52) U.S. Cl.
CPC ........... *B25J 19/06* (2013.01); *B25J 19/0075* (2013.01); *B25J 19/063* (2013.01); *Y10S 901/46* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,694,231 A | | 9/1987 | Alvite' | |
| 4,904,514 A | * | 2/1990 | Morrison | B25J 19/0083 428/53 |
| 5,151,007 A | * | 9/1992 | Maruo | B25J 9/042 414/744.2 |
| 5,674,294 A | * | 10/1997 | Bainville | A61F 2/442 623/17.16 |
| 5,744,728 A | * | 4/1998 | Suita | B25J 19/063 73/862.542 |
| 5,901,756 A | * | 5/1999 | Goodrich | F16L 3/233 138/110 |
| 5,915,673 A | * | 6/1999 | Kazerooni | B66C 1/62 212/285 |

(Continued)

FOREIGN PATENT DOCUMENTS

| CN | 102482040 A | 5/2012 |
|---|---|---|
| CN | 103386684 A | 11/2013 |

(Continued)

OTHER PUBLICATIONS

M. W. Strohmayr, et.al. "The DLR Artificial Skin Step II: Scalability as a Prerequisite for Whole-Body Covers", Intelligent Robots and Systems (IROS), Nov. 2013, pp. 4721-4728.

*Primary Examiner* — Bhavesh V Amin
(74) *Attorney, Agent, or Firm* — Hauptman Ham, LLP

(57) ABSTRACT

A human-cooperative industrial robot having a base unit and a movable unit movably provided on or above the base unit. The robot includes a protection member composed of a material with a rigidity lower than rigidities of the base unit and the movable unit, the protection member covering a circumference of at least the movable unit of the base unit and the movable unit; and a detector provided on at least either the base unit or the movable unit to detect an external force input through the protection member.

3 Claims, 6 Drawing Sheets

(56) References Cited

U.S. PATENT DOCUMENTS

| | | | | |
|---|---|---|---|---|
| 6,517,414 | B1* | 2/2003 | Tobin | B24B 49/16 |
| | | | | 451/21 |
| 6,543,307 | B2* | 4/2003 | Ambrose | B25J 19/0025 |
| | | | | 74/490.01 |
| 6,754,919 | B2* | 6/2004 | Leaphart, Jr. | A47G 9/062 |
| | | | | 5/417 |
| 7,422,773 | B2* | 9/2008 | D'Andreta | B05B 5/0533 |
| | | | | 118/323 |
| 2002/0144565 | A1 | 10/2002 | Ambrose | |
| 2003/0137219 | A1 | 7/2003 | Heiligensetzer et al. | |
| 2004/0052630 | A1* | 3/2004 | Nihei | B25J 13/085 |
| | | | | 414/730 |
| 2004/0088081 | A1* | 5/2004 | Song | A47L 9/2805 |
| | | | | 700/259 |
| 2004/0111184 | A1* | 6/2004 | Chiappetta | G05D 1/0225 |
| | | | | 700/245 |
| 2004/0204792 | A1* | 10/2004 | Taylor | A47L 9/2805 |
| | | | | 700/245 |
| 2006/0004486 | A1* | 1/2006 | Yoshikawa | B60W 50/14 |
| | | | | 700/245 |
| 2006/0079998 | A1* | 4/2006 | Yoshikawa | B25J 19/021 |
| | | | | 700/245 |
| 2006/0206043 | A1* | 9/2006 | Yakimovich | A61F 5/0125 |
| | | | | 602/16 |
| 2008/0161970 | A1* | 7/2008 | Adachi | B25J 9/0003 |
| | | | | 700/253 |
| 2009/0025199 | A1* | 1/2009 | Hariki | B25J 9/1682 |
| | | | | 29/430 |
| 2009/0055019 | A1* | 2/2009 | Stiehl | B25J 9/1671 |
| | | | | 700/249 |
| 2010/0000009 | A1* | 1/2010 | Morgan | A42B 3/124 |
| | | | | 2/414 |
| 2010/0041991 | A1* | 2/2010 | Roundhill | A61B 8/4281 |
| | | | | 600/443 |
| 2010/0139437 | A1* | 6/2010 | Ichikawa | B25J 9/1612 |
| | | | | 74/490.05 |
| 2011/0264014 | A1* | 10/2011 | Angold | B25J 9/0006 |
| | | | | 601/35 |
| 2012/0163953 | A1 | 6/2012 | Murano et al. | |
| 2012/0209428 | A1* | 8/2012 | Mizutani | G05B 19/423 |
| | | | | 700/250 |
| 2014/0222023 | A1* | 8/2014 | Kim | A61B 34/30 |
| | | | | 606/130 |
| 2014/0285633 | A1* | 9/2014 | Maruyama | G06T 1/0014 |
| | | | | 348/47 |
| 2015/0174771 | A1* | 6/2015 | Fujita | B25J 19/06 |
| | | | | 700/258 |
| 2017/0341239 | A1* | 11/2017 | Nakayama | B25J 19/0091 |

FOREIGN PATENT DOCUMENTS

| | | |
|---|---|---|
| CN | 203266675 U | 11/2013 |
| DE | 3713144 A1 | 10/1987 |
| DE | 69501292 T2 | 5/1998 |
| DE | 202005002475 U1 | 6/2006 |
| DE | 102006044071 A1 | 4/2008 |
| DE | 102008063081 A1 | 8/2010 |
| EP | 1810795 A1 | 7/2007 |
| JP | 10-249785 A | 9/1998 |
| JP | 2007-102719 A | 4/2007 |
| JP | 2010-10116 A | 1/2010 |
| JP | 2010-125546 A | 6/2010 |
| JP | 2010-188504 A | 9/2010 |

* cited by examiner

HUMAN-COOPERATIVE INDUSTRIAL ROBOT INCLUDING PROTECTION MEMBER

RELATED APPLICATIONS

The present application claims priority to Japanese Application Number 2013-67253, filed Dec. 25, 2013, the disclosure of which is hereby incorporated by reference herein in its entirety.

BACKGROUND OF INVENTION

1. Field of the Invention

The present invention relates to a human-cooperative industrial robot including a protection member.

2. Description of the Related Art

In the case of a human-cooperative industrial robot working in cooperation with a human worker, the worker and the robot may come close to each other during work and may mistakenly come in contact with each other. In order to maintain the safety of human workers against such accidental contact, there is conventionally known a robot in which joints of the robot are covered with an impact absorber made of foamed rubber. As a robot of such a type, for example, a robot disclosed in Japanese Laid-open Patent Publication No. 2010-125546 (JP2010-125546A) includes a tactile sensor for detecting a contact between a worker and the robot arranged on an impact absorption section, in which operation mode is switched upon detection of the contact.

However, in the robot of JP2010-125546A, the tactile sensor is arranged on the impact absorption section having elasticity and thus has a narrow range of detection. Accordingly, in order to detect contact between a worker and the robot over a wide range, it is necessary to arrange a large number of tactile sensors in a high-density, and thus the wiring of sensor cables and the like become complicated.

SUMMARY OF THE INVENTION

According to an aspect of the present invention, there is provided a human-cooperative industrial robot including a base unit; a movable unit movably provided on or above the base unit; a protection member composed of a material with a rigidity lower than rigidities of the base unit and the movable unit, the protection member covering a circumference of at least the movable unit of the base unit and the movable unit; and a detector provided on at least either the base unit or the movable unit to detect an external force input through the protection member.

BRIEF DESCRIPTION OF THE DRAWINGS

The foregoing and other objects, features, and advantages of the present invention will be more apparent from the following description of preferred embodiments taken in conjunction with the accompanying drawings in which.

DETAILED DESCRIPTION

Hereinafter, a human-cooperative industrial robot according to an embodiment of the present invention will be described with reference to FIGS. 1A to 10B. The human-cooperative industrial robot refers to an industrial robot working in cooperation with a human worker. Typical industrial robots carry out their work in an area surrounded by a safety fence where entry is restricted, so that the safety of workers can be ensured. On the other hand, in the case of a human-cooperative industrial robot, a worker may enter a work area for the robot to carry out work, and thus may come in contact with the robot during work. Accordingly, the safety of workers needs to be maintained upon contact with the robot, as well as contact between a worker and the robot needs to be detected early.

Figure 1A:
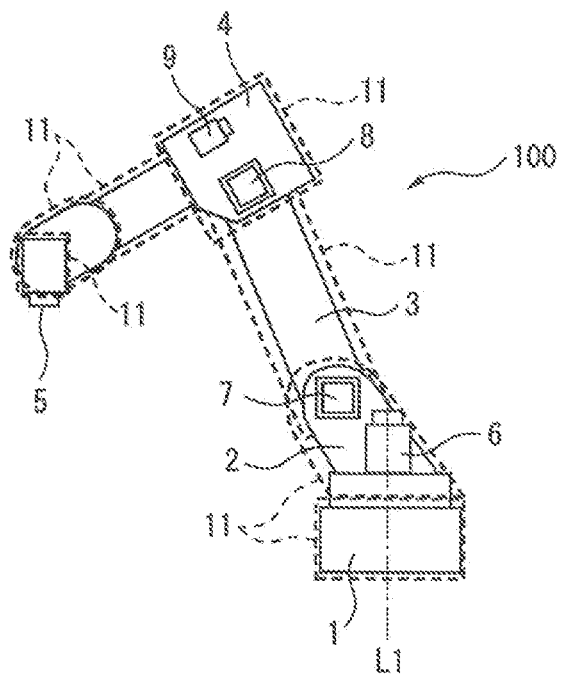
FIG. 1A is a side view illustrating a structure of a human-cooperative industrial robot according to an embodiment of the present invention.
Figure 1B:
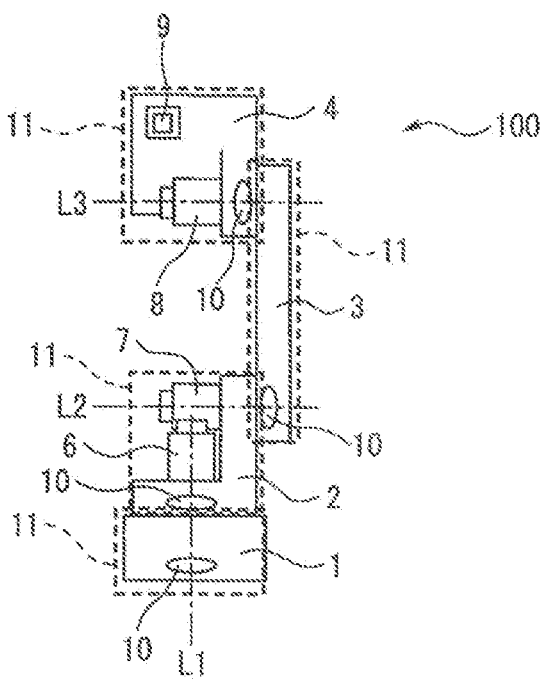
FIG. 1B is a front view illustrating the structure of the human-cooperative industrial robot according to the embodiment of the invention.

FIGS. 1A and 1B are a side view and a front view illustrating a structure of a human-cooperative industrial robot 100 according to an embodiment of the present invention. The robot 100 is a multi-jointed robot including a plurality of links 2 to 4 movably provided on or above a base unit 1. The term "links" refer to individual rigid body elements forming a machine structure and movable relatively with respect to each other.

As illustrated in FIGS. 1A and 1B, the robot 100 includes the base unit 1, a first link 2 pivotably provided around an axial line L1 extending in a vertical direction on or above the base unit 1, a second link 3 rotatably supported to the first link 2 around an axial line L2 extending in a horizontal direction, a third link 4 rotatably supported to a tip portion of the second link 3 around an axial line L3 extending in the horizontal direction, and a wrist unit 5 provided at a tip portion of the third link 4. The first link 2, the second link 3, and the third link 4, respectively, are also referred to as the pivoting unit, the lower arm, and the upper arm.

On the first link 2, a servo motor 6 is mounted along the axial line L1. The first link 2 pivots on the base unit 1 by driving of the servo motor 6. On the first link 2, a servo motor 7 is mounted along the axial line L2. The second link 3 rotates with respect to the first link 2 by driving of the servo motor 7. At a base end portion of the third link 4, a servo motor 8 is mounted along the axial line L3. The third link 4 rotates with respect to the second link 3 by driving of the servo motor 8. At the tip portion of the third link 4, a servo motor 9 is mounted. The wrist unit 5 is operated by driving of the servo motor 9. The servo motors 6 to 9 are robot-driving motors.

Near the base unit 1 and respective drive shafts (axial lines L1 to L3) of the links 2 to 4, external force detection sensors 10 which detect external force acting on the base unit 1 and the links 2 to 4 are provided. The external force detection sensors 10 can be, for example, a force sensor, a torque sensor, a displacement sensor, or the like. When the external force detection sensors 10 are displacement sensors, for example, a relationship between a displacement and external force may be determined in advance and the relationship may be used to indirectly detect an external force from a detected displacement value. Each of the base unit 1 and the links 2 to 4 has one external force detection sensor 10.

Circumferences of the base unit 1 and the links 2 to 4, respectively, are covered with a protection member 11 (a dotted line). The protection member 11 is composed of a low-rigid material having elasticity such as sponge, rubber, or urethane.

Figure 2:
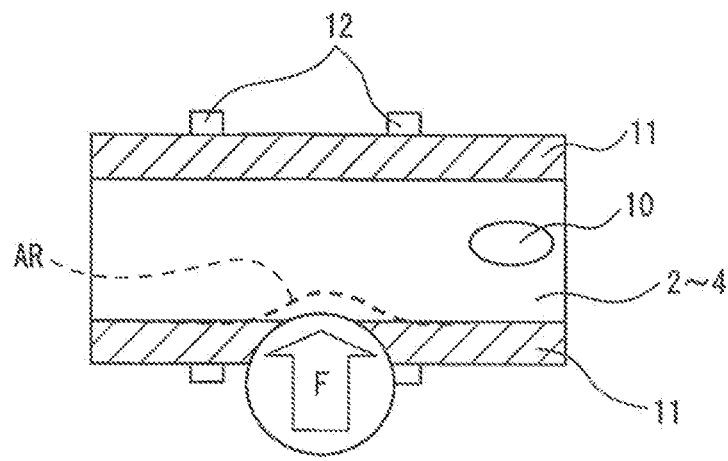
FIG. 2 is a sectional view of a main part of links forming the robot of FIGS. 1A and 1B.

FIG. 2 is a sectional view of a main part of the links 2 to 4. As illustrated in FIG. 2, the protection member 11 is fixed by a band 12 in a state of being in close contact with an external peripheral surface of each of the links 2 to 4. The protection member 11 may alternatively be fixed by another fixing method, such as an adhesive agent or a bolt. The protection member 11 is also fixed to a surface of the base unit 1 in the same manner, although not shown in the drawing.

In the robot 100 as described above, when any of the links 2 to 4 contacts with a worker, an obstacle, or like, a compressive force acts on the protection member 11 and squashes the protection member 11. The compressive force (external force F) acts on the any of the links 2 to 4 in a dotted line area AR of FIG. 2 and then is detected by the external force sensor 10. Since the protection member 11 is in close contact with the surfaces of the links 2 to 4, the external force sensor 10 can detect, with high sensitivity, the external force F acting on the any of the links 2 to 4 through the protection member 11.

Figure 3:
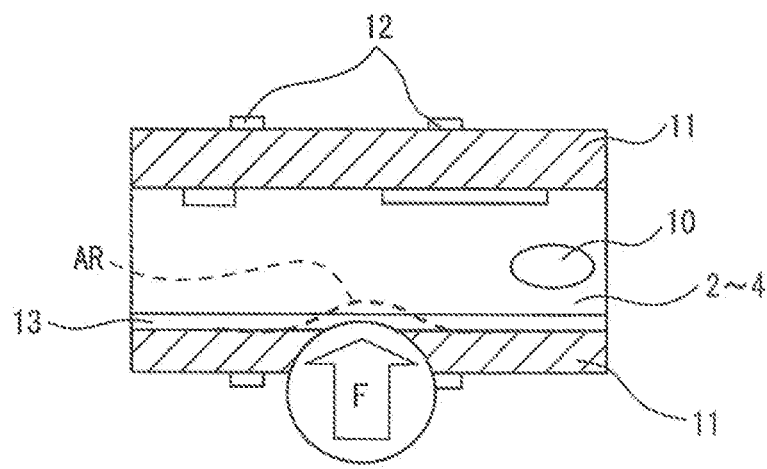
FIG. 3 is a diagram illustrating a modified example of the main part of the links illustrated in FIG. 2.

FIG. 3 is a diagram illustrating a modified example of the main part of the links illustrated in FIG. 2. In FIG. 3, similarly to FIG. 2, the protection member 11 is fixed by the band 12, but unlike FIG. 2, a minute clearance 13 is provided between the links 2 to 4 and the protection member 11. In FIG. 3, when any of the links 2 to 4 comes in contact with a worker, an obstacle, or the like, a compressive force (external force F) acts on the protection member 11 and causes the protection member 11 to be deformed. As a result, the protection member 11 closely contacts with the any of the links 2 to 4, whereby the external force F acts on the dotted area AR of FIG. 3 and then is detected by the external force detection sensor 10.

Thus, even when the clearance 13 is present between the links 2 to 4 and the protection member 11, the external force detection sensor 10 mounted in each of the links 2 to 4 can detect the external force F input through the protection member 11. Therefore, the protection member 11 does not have to be mounted in close contact with the links 2 to 4, and therefore the protection member 11 can be easily mounted even on links 2 to 4 and a base unit 1 having poor dimensional precision or having complicated shapes with uneven portions or the like.

Figure 4:
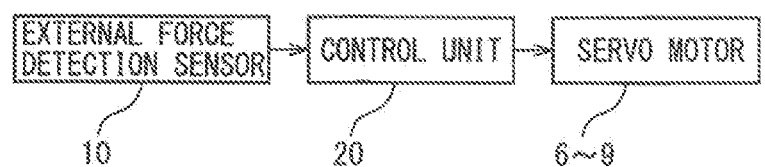
FIG. 4 is a block diagram illustrating a configuration for control of the human-cooperative industrial robot according to the embodiment of the invention.

FIG. 4 is a block diagram illustrating a configuration for control of the robot 100. A signal from the external force detection sensor 10 is input to a control unit 20. The control unit 20 includes a calculation processing device including a CPU, a ROM, a RAM, and other peripheral circuits. The control unit 20 judges the presence or absence of contact between any of the links 2 to 4 and a worker, an obstacle, or the like based on the signal from the external force detection sensor 10, and controls the driving of the servo motors 6 to 9 according to a result of the judgment. For example, when the external force F detected by the external force detection sensor 10 is equal to or more than a predetermined threshold value Fa, the control unit 20 judges that there is a contact between any of the links 2 to 4 and a worker and outputs a stop signal to the servo motors 6 to 9 to stop or decelerate the operation of the robot 100.

Figure 5:
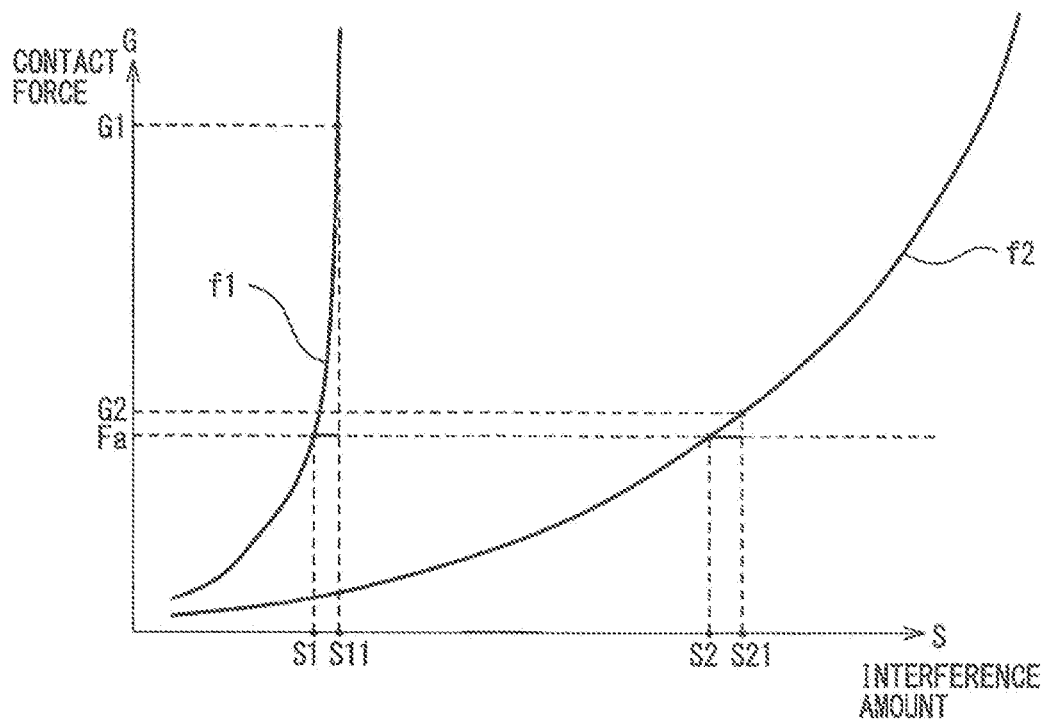
FIG. 5 is a graph illustrating operational characteristics of the human-cooperative industrial robot according to the embodiment of the invention.

FIG. 5 is a characteristic diagram illustrating a relationship between an amount of movement (interference amount) S of any of the links 2 to 4 and a force (a contact force) G which a worker receives from the any of the links 2 to 4 when the any of the links 2 to 4 contacts with a worker due to movements of the links 2 to 4. In FIG. 5, f1 represents characteristics obtained when the links 2 to 4 do not include the protection member 11, while f2 represents characteristics obtained when the links 2 to 4 include the protection member 11, i.e., characteristics of the robot 100 according to the embodiment of the invention. The contact force G is equal to the external force F acting on the links 2 to 4.

As illustrated in the characteristics f1 of FIG. 5, when the links 2 to 4 do not have the protection member 11, the contact force G rapidly increases after any of the links 2 to 4 contacts with a worker. When the interference amount S becomes S1 and the contact force G (=external force F) reaches a predetermined value Fa, the control unit 20 outputs a stop signal to the servo motors 6 to 9. However, the links 2 to 4 do not stop immediately and perform inertia running due to an inertial force. Then, the links 2 to 4 stop in a state where the inference amount S has become S11. As a result, during the period of time in which the interference amount S is from S1 to S11, the contact force G greatly increases and then becomes G1 upon stop of the links, which is thus significantly larger than the predetermined external force value Fa for stopping the servo motors 6 to 9.

On the other hand, when the links 2 to 4 include the protection member 11, the protection member 11 is compressed after any of the links 2 to 4 contacts with a worker. Thus, as illustrated in the characteristics f2 of FIG. 5, the contact force G increases more gently than the characteristics f1. When the interference amount S becomes S2 larger than S1 and the contact force G reaches the predetermined value Fa, the control unit 20 outputs a stop signal to the servo motors 6 to 9. However, the links 2 to 4 do not stop immediately and perform inertia running due to an inertial force. Then, the links 2 to 4 stop in a state where the interference amount S has become S21. In this case, since the links 2 to 4 include the protection member 11, the contact force G gently increases. Thus, an amount of increase in the contact force G during a period of time in which the interference amount S is from S1 to S21 is smaller than that in the characteristics f1, and the contact force G upon stop of the links becomes G2 smaller than G1. As a result, the contact force G, which acts on the worker, can be suppressed. In particular, considering that the worker may not be able to evade upon contact with any of the links 2 to 4 because of being positioned between the any of the links 2 to 4 and a structural object or the like, it is effective to provide the protection member 11 on the circumferences of the links 2 to 4, as in the present embodiment.

The embodiment of the present invention can provide the following advantageous effects:

(1) In the human-cooperative industrial robot 100 including the base unit 1 and the links 2 to 4 movably provided on or above the base unit 1, the circumferences of the base unit 1 and the links 2 to 4 are covered with the low-rigid protection member 11, and the external force detection sensor 10 is mounted in each of the base unit 1 and the links 2 to 4 to detect the external force F input through the protection member 11.

In this structure, even when the external force F acts on any part of the protection member 11, the external force F is transmitted to the links 2 to 4 through the protection member 11. Accordingly, the single external force detection sensor 10 mounted in each of the links 2 to 4 can detect the external force F. As a result, the number of the external force detection sensors 10 can be saved, and it is possible to facilitate the wiring of sensor cables.

Figure 6A:
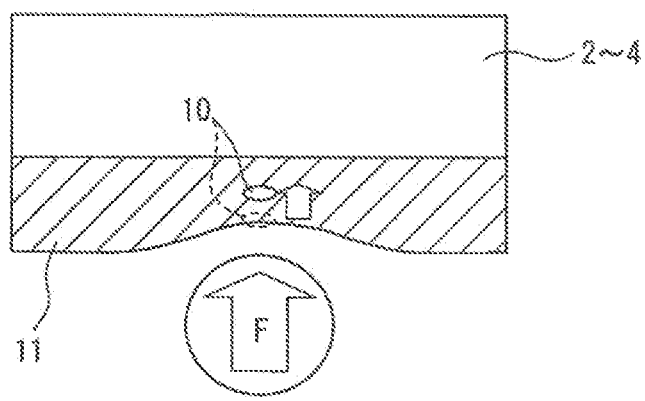
FIG. 6A is a diagram illustrating a comparative example of the embodiment of the invention.
Figure 6B:
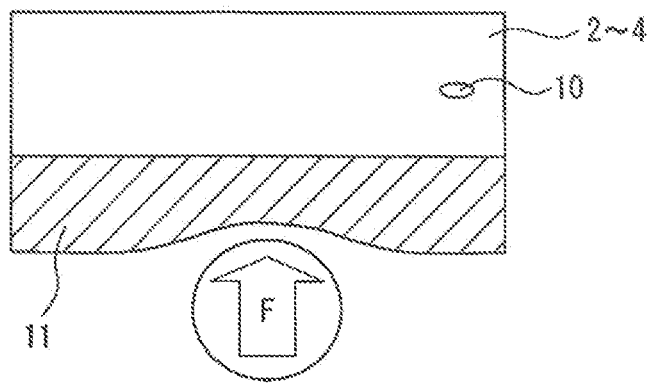
FIG. 6B is a diagram illustrating a mounting state of an external force detection sensor according to the embodiment of the invention.

FIGS. 6A and 6B, respectively, are diagrams illustrating examples in which the external force detection sensor 10 is mounted in the protection member 11 and the links 2 to 4. As illustrated in FIG. 6A, in the example in which the external force detection sensor 10 is mounted in the protection member 11, when the external force F acts on the protection member 11, the protection member 11 is deformed, which causes the position of the external force detection sensor 10 to be shifted. This reduces the force transmitted to the external force detection sensor 10, thus degrading sensor sensitivity. On the other hand, in the example in which the external force detection sensor 10 is mounted in the links 2 to 4 as illustrated in FIG. 6B, the position of the external force detection sensor 10 is invariable, so that high sensor sensitivity can be maintained.

In addition, since the protection member 11 comes in contact with a worker, an obstacle, or the like, deterioration or wearing of the member easily progresses and replacement is often necessary. Accordingly, arranging the external force detection sensor 10 on the protection member 11 as illustrated in FIG. 6A increases maintenance cost. On the other hand, arranging the external force detection sensor 10 on the links 2 to 4 as in the present embodiment can suppress increase in maintenance cost.

After movements of the links 2 to 4 cause a contact between any of the links 2 to 4 and a worker, the contact force G acting on the worker gently increases (the characteristics f2 of FIG. 5), so that increase in the contact force G due to inertia running of the links 2 to 4 can be suppressed. In order to suppress increase in the contact force G, it may be considerable to include such a structure as will shorten a distance of inertia running. In this case, however, a large impact force acts on the robot 100 and therefore reinforcement of the robot 100 is required, which in turn requires a large amount of cost.

Upon contact with the robot 100, the worker takes evasive action by himself or herself. In this respect, as in the present embodiment, covering the links 2 to 4 with the low-rigid protection member 11 allows the worker to evade safely in a state in which the contact force G occurring at the beginning of the contact with the robot 100 is small. The robot 100 covered with the low-rigid protection member 11 has less damage to workers even when it contacts therewith. Accordingly, the robot can give a psychological sense of safety to workers working near the robot 100. On the other hand, ensuring safety against contact with the robot only by covering the circumferences of the links 2 to 4 with the protection member 11 requires increase in a thickness of the protection member 11. This leads to a significant increase in thicknesses of the links 2 to 4. As a result, the links may interfere with each other, thereby restricting an operational range of the robot 100. In contrast, as in the present embodiment, not only covering the circumferences of the links 2 to 4 with the protection member 11 but also mounting the external force detection sensor 10 on each of the links 2 to 4 can ensure safety against contact with the robot, without increasing the thickness of the protection member 11. Sensor cables and the like of the external force detection sensor 10 may be broken by action of an external force. However, covering fragile portions such as sensor cables with the protection member 11 can prevent the external force detection sensor 10 from being broken.

(2) Fixing the protection member 11 in close contact with the external peripheral surfaces of the links 2 to 4 (FIG. 2) can improve the sensitivity of the external force detection sensor 10. The protection member 11 can also be fixed to the external peripheral surfaces of the links 2 to 4 through the clearance 13 provided therebetween (FIG. 3). Even in this case, the external force F acting on any of the links 2 to 4 through the protection member 11 can be detected. Accordingly, the protection member 11 can be easily mounted even on links 2 to 4 having complicated shapes or links 2 to 4 having large dimensional errors or the like in manufacturing.

Figure 7:
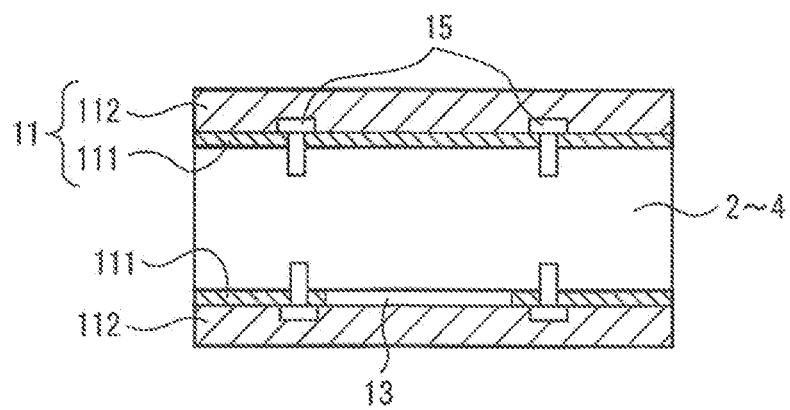
FIG. 7 is a diagram illustrating a modified example of the main part of the links illustrated in FIG. 2.

A structure of the protection member 11 covering the circumferences of the links 2 to 4 is not limited to the one described above. FIG. 7 is a diagram illustrating a modified example of the main part of the links illustrated in FIG. 2. In FIG. 7, the protection member 11 is formed by laminating a plurality of layers 111 and 112 having different rigidities. In other words, the external peripheral surfaces of the links 2 to 4 are covered with a first layer (a high-rigid portion) and then a circumference of the first layer 111 is covered with a second layer (a low-rigid portion) 112 composed of a material having lower rigidity than the first layer 111. The protection member 11 may be composed of not a two-layered structure but a three or more layered structure. Alternatively, a part of the protection member 11 may be formed by a plurality of layers.

The high-rigid portion 111 can be composed of, for example, iron, aluminium, copper, MC nylon, polyacetal, polyetheretherketone (PEEK), or the like. The low-rigid portion 112 can be composed of, for example, sponge, rubber, urethane, or the like. The high-rigid portion 111 and the low-rigid portion 112 are integrated together by an adhesive agent, a bolt, or the like, and the protection member 11 in the integrated state is fixed to the links by a band, an adhesive agent, a bolt, or the like. In FIG. 7, the high-rigid portion 111 is fixed to the links 2 to 4 by a bolt 15. The use of the bolt 15 facilitates attachment and detachment of the protection member 11.

Figure 8:
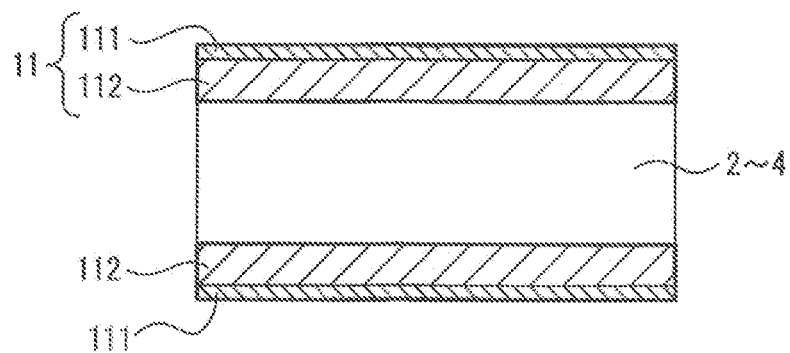
FIG. 8 is a diagram illustrating another modified example of the main part of the links illustrated in FIG. 2.

As described above, in the protection member 11 having the two-layered structure in which the outside layer has lower rigidity than that of the inside layer, the high-rigid portion 111 easily transmits an external force, so that the sensitivity of the external force detection sensor 10 is improved even when the protection member 11 is arranged with a clearance from the external peripheral surfaces of the links 2 to 4, as illustrated in FIG. 3. As illustrated in FIG. 8, the circumferences of the links 2 to 4 may be covered with the low-rigid portion 112 and the circumference of the low-rigid portion 112 may be covered with the high-rigid portion 111. In this case, abrasion resistance of the protection member 11 is improved.

Figure 9A:
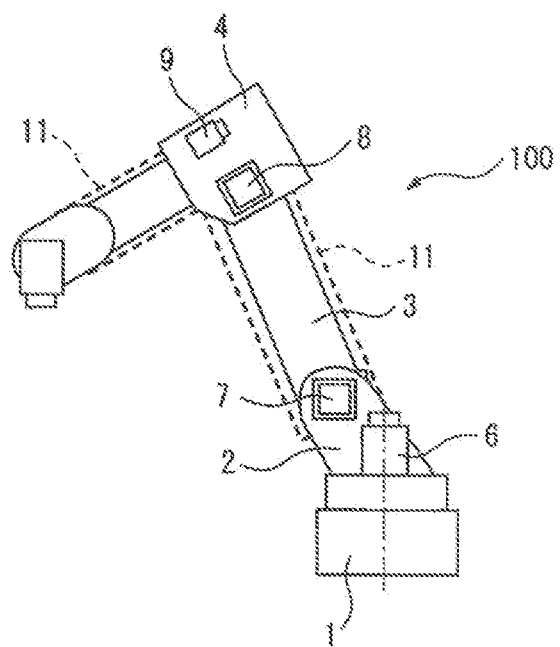
FIG. 9A is a diagram illustrating a modified example of the structure of the robot illustrated in FIG. 1A.
Figure 9B:
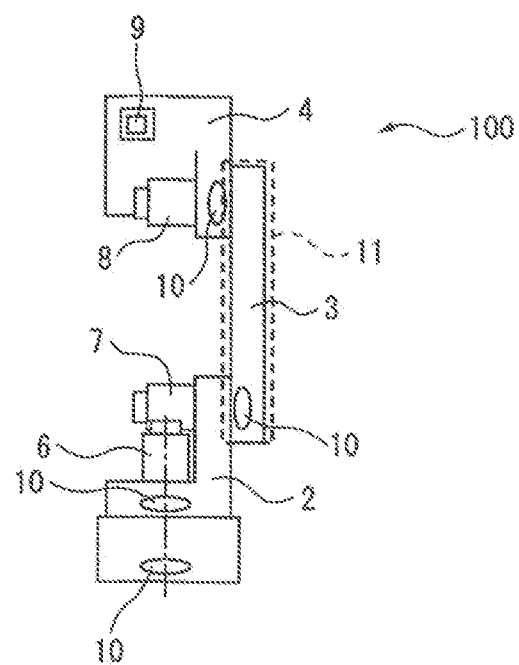
FIG. 9B is a diagram illustrating a modified example of the structure of the robot illustrated in FIG. 1B.

In the above embodiment, all of the base unit 1 and the links 2 to 4 are covered with the protection member 11. However, only a part of the base unit 1 and the links 2 to 4, either likely or highly likely to contact with a worker or an obstacle, may be covered with the protection member 11. FIGS. 9A and 9B are diagrams illustrating a modified example of the structure of the robot illustrated in FIGS. 1A and 1B. In FIGS. 9A and 9B, only a part of each of the second link 3 and the third link 4 is covered with the protection member 11.

Figure 10A:
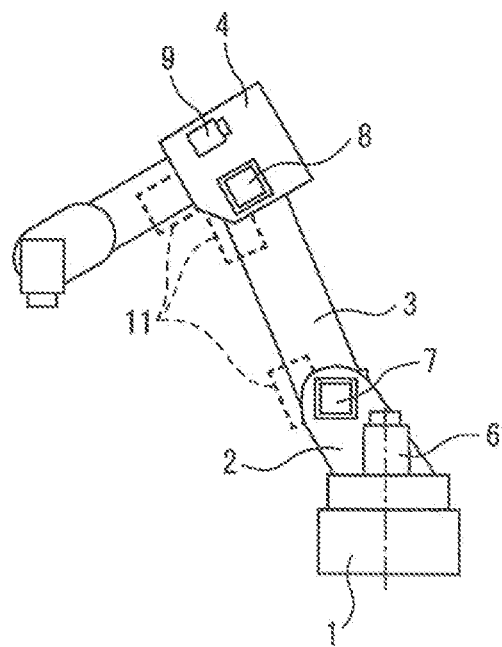
FIG. 10A is a diagram illustrating another modified example of the structure of the robot illustrated in FIG. 1A.
Figure 10B:
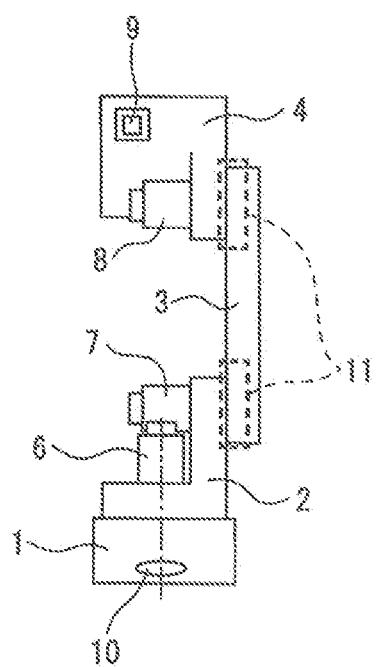
FIG. 10B is a diagram illustrating another modified example of the structure of the robot illustrated in FIG. 1B.

In the above embodiment, the external force detection sensor 10 is arranged on all of the base unit 1 and the links 2 to 4, and the presence or absence of a contact between a worker or an obstacle and the robot including the protection member 11 is detected based on a detected external force. However, when the presence or absence of the contact can be detected by a single external force detection sensor 10, the external force detection sensor 10 may be arranged on a part of the base unit 1 and the links 2 to 4. FIGS. 10A and 10B are diagrams illustrating one example for such a structure as described above. In FIGS. 10A and 10B, the external force detection sensor 10 is arranged only on the base unit 1. Even this structure can detect the presence or absence of an external force applied to any of the base unit 1 and the links 2 to 4 and the presence or absence of contact. In FIGS. 10A and 10B also, similarly to FIGS. 9A and 9B, only a part of the links 2 to 4 is covered with the protection member 11.

In the above embodiment, the external force detection sensor 10 detects an external force input through the protection member 11 and, based on the external force, detects the presence or absence of a contact between a worker or an obstacle and the robot 100 including the protection member 11. However, the presence or absence of the contact may be detected by another sensor. In other words, the presence or absence of the contact may be detected by detecting another physical amount (other than an external force) input through the protection member 11.

In the above embodiment, the movable unit is formed by the first link 2, the second link 3 and the third link 4 rotatable with respect to the base unit 1. However, the structure of the movable unit is not limited to that described above as long as the movable unit can be moved on or above the base unit 1. For example, the movable unit may include a member linearly movable with respect to the base unit 1. The movable unit may be formed not by the plurality of members (links 2 to 4) as described above but by a single member. The structure of the protection member 11 can be any structure as long as the member is composed of a material having lower rigidity than the base unit 1 and the movable unit and covers the circumference of at least the movable unit of the base unit 1 and the movable unit. In this case, the protection member 11 may cover either a part of the movable unit or the entire part thereof. The structure of the external force detection sensor 10 as the detector can be any structure as long as the sensor is arranged on at least either the base unit 1 or the movable unit to detect an external force input through the protection member 11.

In the above embodiment, the protection member 11 and the external force detection sensor 10 (detector) are applied to the robot 100 including the plurality of links 2 to 4 provided on or above the base unit 1. However, the present invention can be similarly applied as long as it is a human-cooperative industrial robot including a base unit and a movable unit movably provided on or above the base unit.

It is possible to arbitrarily combine any of the embodiments with one or more of the modified examples.

In the present invention, at least the circumference of the movable unit is covered with a low-rigid protection member and the detector detecting an external force input through the protection member is arranged on at least either the base unit or the movable unit. Therefore, there is no need for high-density arrangement of sensors for detecting a contact between a worker and the robot, thus facilitating the wiring of sensor cables.

While the present invention has been described above in relation with some preferable embodiments of the invention, it will be understood by those skilled in the art that various changes and modifications can be made without departing from the scope of the invention disclosed in the claims appended below.

The invention claimed is:

1. A human-cooperative industrial robot, comprising:
   a base unit;
   a movable unit movably provided on or above the base unit;
   a protection member of a material having a rigidity lower than rigidities of the base unit and the movable unit, the protection member covering a circumference of at least the movable unit; and
   a detector mounted in at least one of the base unit and the movable unit,
   wherein the detector is configured to detect an external force transmitted through the protection member and through said at least one of the base unit and the moveable unit, to the detector,
   wherein the detector is arranged at a position spaced apart from the protection member without contacting the protection member and is fixed directly to said at least one of the base unit and the movable unit,
   wherein the external force transmits through said at least one of the base unit and the movable unit to the detector and is detected by the detector, and
   wherein the protection member is fixed with a clearance from an external peripheral surface of the base unit or the movable unit.

2. The human-cooperative industrial robot according to claim 1, wherein the protection member has a plurality of laminated layers having different rigidities.

3. The human-cooperative industrial robot according to claim 1, wherein
   the protection member includes a high-rigid layer and a low-rigid layer laminated to the high-rigid layer, and
   the high-rigid layer is in direct contact with an external peripheral surface of the base unit or the movable unit.

* * * * *